United States Patent
Huff et al.

(10) Patent No.: US 7,622,428 B2
(45) Date of Patent: Nov. 24, 2009

(54) USE OF AQUEOUS DISPERSIONS FOR TERTIARY MINERAL OIL PRODUCTION

(75) Inventors: Jürgen Huff, Ludwigshafen (DE); Marcus Guzmann, Muhlhausen (DE); Gregor Brodt, Heppenheim (DE); Pulakesh Mukherjee, Mannheim (DE); Peter Poganiuch, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 141 days.

(21) Appl. No.: 11/814,648

(22) PCT Filed: Jan. 23, 2006

(86) PCT No.: PCT/EP2006/050376

§ 371 (c)(1),
(2), (4) Date: Jul. 24, 2007

(87) PCT Pub. No.: WO2006/079615

PCT Pub. Date: Aug. 3, 2006

(65) Prior Publication Data

US 2008/0194434 A1    Aug. 14, 2008

(30) Foreign Application Priority Data

Jan. 25, 2005    (DE) .................. 10 2005 003 569

(51) Int. Cl.
*C09K 8/588* (2006.01)
(52) U.S. Cl. ............... 507/221; 524/159; 524/157; 524/158; 524/161; 524/505
(58) Field of Classification Search .............. 507/221
See application file for complete search history.

(56) References Cited

U.S. PATENT DOCUMENTS

| 4,380,600 | A | 4/1983 | Hosoda et al. |
| 4,702,319 | A | 10/1987 | Bock et al. |
| 4,970,251 | A | 11/1990 | Hsieh |
| 5,139,087 | A | 8/1992 | Hutchins et al. |
| 5,244,936 | A | 9/1993 | Mitchell |
| 6,020,289 | A | 2/2000 | Dymond |
| 6,271,307 | B1 * | 8/2001 | Huff et al. .............. 525/61 |

FOREIGN PATENT DOCUMENTS

| EP | 0 408 011 B1 | 1/1991 |
| EP | 0 452 758 A2 | 10/1991 |
| WO | WO-97/42397 | 11/1997 |
| WO | WO-03/046024 A1 | 6/2003 |

OTHER PUBLICATIONS

Taylor, Kevin C. et al. "Water-soluble hydrophobically associating polymers for improved oil recovery: A literature review," *Journal of Petroleum Science and Engineering*, 1998, pp. 265-280, vol. 19.
Fikentscher, Von H., "Systematik der Cellulosen auf Grund ihrer Viskosität in Lösung," *Cellulose-Chemie*, 1932, (4): pp. 71-74 and (3): 58-64.

* cited by examiner

*Primary Examiner*—Timothy J. Kugel
*Assistant Examiner*—Atnaf Admasu
(74) *Attorney, Agent, or Firm*—Connolly Bove Lodge & Hutz LLP

(57) ABSTRACT

Use of water-soluble polymers for tertiary mineral oil production by introducing the polymer into a mineral oil deposit, in which the water-soluble polymers are used in the form of a dispersion of the water-soluble polymer and at least one water-soluble, polymeric stabilizer.

20 Claims, No Drawings

USE OF AQUEOUS DISPERSIONS FOR TERTIARY MINERAL OIL PRODUCTION

CROSS REFERENCE TO RELATED APPLICATIONS

This application is a National Phase of International Application No. PCT/LP2006/050376 filed on Jan. 23, 2006, which claims priority to Application No. 102005003569.8 filed in Germany on Jan. 25, 2005 under 35 U.S.C. § 119; the entire contents of all are hereby incorporated by reference.

The invention relates to the use of water-soluble polymers for tertiary mineral oil production by introducing the polymer into a mineral oil deposit, in which the water-soluble polymers are used in the form of a dispersion of the water-soluble polymer and at least one water-soluble, polymeric stabilizer.

In the known techniques for mineral oil production, usually only a part of the mineral oil present in the deposit can be recovered. After exploratory drilling of a new deposit, the mineral oil is as a rule recovered under the natural pressure in the deposit. This is the so-called primary production. If the deposit pressure declines, the deposit pressure can then be increased again or maintained by forcing in water. This is the so-called secondary mineral oil production.

However, even by means of secondary production, a considerable part of the mineral oil cannot be removed from the reservoir rock. Often 65% or more of the oil still remain in the deposit after primary and secondary production.

It is known that the yield can be further increased by tertiary oil production measures. An overview of tertiary oil production is to be found, for example, in *Journal of Petroleum Science and Engineering* 19 (1998) 265-280. Tertiary oil production includes, for example, hot processes in which hot water or superheated steam (so-called "steam flooding") is forced into the deposit. This reduces the viscosity of the oil. Gases, such as $CO_2$ or nitrogen, may also be used as flooding medium. Processes in which suitable chemicals are used as assistants are furthermore known. For example, suitable surfactants can be used for better release of the mineral oil from the rock ("surfactant flooding"). The addition of viscosity-increasing polymers to the aqueous phase is furthermore known. As a result of this, the viscosity of the aqueous phase is matched with that of the oil phase and the oil can be more easily displaced by the aqueous phase from the porous formation. This technique is known as so-called "polymer flooding". Details of the technique are described, for example, in the monograph by W. Littmann, *"Polymer Flooding"*, Elsevier Amsterdam, New York 1988. Combinations of the techniques described are also possible, for example the WAG (water alternated with gas) technique in which flooding is effected with water and a gas, such as, for example, $CO_2$, in combination.

For polymer flooding, in particular high molecular weight polyacrylamide derivatives, for example partly hydrolyzed polyacrylamides or xanthans, are used. Typical molecular weights $M_w$ are of the order of magnitude of from 1 000 000 to 20 000 000 g/mol. U.S. Pat. No. 4,702,319 discloses a copolymer of acrylamide, modified acrylamide and monomers containing sulfo groups, and U.S. Pat. No. 6,020,289 discloses a copolymer with acrylamide derivatives for polymer flooding. The increase in the viscosity of the aqueous phase by the polymers results in an improved flooding efficiency.

WO 97/42397 discloses a composition for polymer flooding comprising a water-soluble polymer, for example polyacrylamide or polyacrylic acid, and a compound having a urea, melamine, benzoguanamine or glycoluril skeleton, the skeleton being modified with hydroxymethyl and alkoxymethyl groups.

In some forms for use, the polymers are used for producing gels which, over and above purely thickening effect, block highly permeable regions of the formation, for example by crosslinking of high molecular weight polymers with suitable polyvalent cations, as described in U.S. Pat. No. 5,244,936. The blocking of the highly permeable regions of the deposits can serve for gaining better access to less permeable but oil-rich sections and hence for increasing the flooding efficiency.

In tertiary mineral oil production, particular application conditions have to be observed. Not all polymers known as thickeners are therefore suitable for use in tertiary oil production.

Temperatures of up to 300° C. usually prevail in mineral oil deposits. The polymers used for polymer flooding should therefore exert no substantial degradation which could lead to an undesired reduction of viscosity, even on prolonged action of relatively high temperatures, for example an action for up to 3 years. Furthermore, high salt loads (for example chlorides, sulfates or bicarbonates of Na, Ca, Mg or Sr ions) are to be expected under certain circumstances in mineral oil deposits, i.e. polymers used must have the desired effect even at relatively high concentrations of salt. Finally, the viscosity of the mineral oil varies very greatly depending on conditions in the deposit. Typical viscosities of low-viscosity mineral oils are about 4 mPa·s, while viscous oils may also reach 200 mPa·s or more. The viscosity of solutions used for polymer flooding should therefore be capable of being changed as easily as possible in order to achieve optimum adaptation to the viscosity of the mineral oil.

Usually, very dilute solutions of polymers are used for polymer flooding. The dissolution of high molecular weight polymers in water presents particular problems. Particularly at the beginning of the dissolution process, very highly viscous phases occur, which may complicate processing, in particular the injectability into the formation. A high viscosity results inter alia in large pressure drops during forcing into the formation. It is as a rule therefore necessary to use suitable dissolving stations comprising mixers, dispersing units or the like on site. For this purpose, U.S. Pat. No. 5,139,087 has proposed, for example, promoting the dissolution process by intensive shearing or by the action of ultrasound. Apart from the cost of apparatus, the shearing of the polymer solutions or the action of ultrasound can lead to undesired degradation of the polymers.

U.S. Pat. No. 4,380,600 discloses aqueous dispersions of water-soluble polymers, in which the polymerization of water-soluble monomers is carried out in the presence of a water-soluble polymer in the weight ratio of 1:5 to 5:1. Use for tertiary mineral oil production is not disclosed.

Our still unpublished application having the application number PCT/EP/04/08011 discloses aqueous dispersions of water-soluble polymers of ethylenically unsaturated anionic monomers by free radical polymerization in an aqueous medium in the presence of at least one stabilizer and the use thereof as thickeners for aqueous systems. Use for tertiary mineral oil production is not disclosed.

It was an object of the invention to provide an improved process for tertiary mineral oil production, by means of which a water-soluble polymer can be introduced into the formation for polymer flooding in a simple manner without the use of expensive dissolving stations.

Accordingly, the use of water-soluble polymers for tertiary mineral oil production by introducing the polymer into a mineral oil deposit was found, the water-soluble polymer being used in the form of a dispersion of the water-soluble polymer and at least one water-soluble, polymeric stabilizer.

Regarding the invention, the following may be stated specifically:

According to the invention, aqueous dispersions of water-soluble polymers are used for tertiary oil production. The dispersions comprise a water-soluble polymer which is stabilized using polymeric, water-soluble stabilizers as a dispersion. Owing to the stabilizer, the dispersions still have a relatively low viscosity and can be easily handled even at relatively high concentrations of polymers in comparison with polymer solutions without a stabilizer.

Preferably used dispersions are those whose viscosity increases in the case of a pH change and/or dilution.

These may be dispersions whose viscosity increases in the case of a pH increase and/or dilution, in particular those dispersions in which the viscosity in the neutral and alkaline range is higher than in the acidic range. They may conversely be dispersions whose viscosity increases in the case of a pH decrease and/or dilution, in particular those dispersions in which the viscosity in the neutral and acidic range is higher than in the alkaline range.

In a preferred embodiment of the invention, the water-soluble polymers are those which comprise monoethylenically unsaturated monomers (A) having acidic groups and optionally monoethylenically unsaturated monomers (B) differing therefrom and/or optionally crosslinking agents (C) as monomeric building blocks.

In the preferred embodiment, the dispersion is prepared by free radical polymerization of the monomers (A) and optionally (B) and/or (C) in an aqueous medium in the presence of at least one polymeric, water-soluble stabilizer. The amount of the stabilizers is as a rule from 5 to 250% by weight, based on the sum of all monomers used.

The acidic monomers (A) are monoethylenically unsaturated monomers which comprise at least one acidic group. The acidic groups may be, for example, carboxyl groups, sulfo groups or phosphonic acid groups. The groups can, however, also be completely or partly neutralized and, for example, are used as alkali metal or ammonium salts.

Examples of monomers (A) include monoethylenically unsaturated $C_3$- to $C_5$-carboxylic acids, such as acrylic acid, methacrylic acid, ethacrylic acid, crotonic acid, maleic acid or fumaric acid, vinylsulfonic acid, styrenesulfonic acid, acrylamidomethylpropanesulfonic acid and vinylphosphonic acid. The preferably used monomers (A) include acrylic acid, methacrylic acid, maleic acid and acrylamidomethylpropanesulfonic acid. Aqueous dispersions of polymers based on acrylic acid are particularly preferred. The monomers (A) can be polymerized either alone to give homopolymers or as a mixture with one another to give copolymers. Examples of these are the homopolymers of acrylic acid or copolymers of acrylic acid with methacrylic acid and/or maleic acid.

As a rule, the amount of monomers (A) is at least 25% by weight, based on the total amount of all monomers used. The amount is preferably at least 50% by weight, particularly preferably at least 75% by weight and very particularly preferably at least 90% by weight.

Optionally, further monoethylenically unsaturated monomers (B) differing from monomers (A) can also be used. These may be neutral or basic monomers. The monomers may have functional groups which impart good water solubility. However, they may also be less water-soluble groups or even hydrophobic groups, provided that the water solubility of the polymer as a whole is not adversely affected thereby to an undesired extent.

Examples of suitable comonomers (B) include acrylamide, methacrylamide, allyl alcohol, allyl ether ethoxylates, vinyl acetate, vinyl propionate, dialkylaminoethyl(meth)acrylates, dialkylaminopropyl(meth)acrylates, diallyldimethylammonium chloride, vinylimidazole and quaternized vinylimidazole. Further examples comprise acrylates of monohydric alcohols having 1 to 4 carbon atoms, methacrylates of monohydric alcohols having 1 or 2 carbon atoms and (meth)acrylates in which the ester groups have additional O atoms, such as, for example, (meth)acrylates of polyalkylene glycols and/or alkylpolyalkylene glycols. Basic monomers, such as dimethylaminoethyl acrylate or dimethylaminoethyl methacrylate may be used both in the form of the free bases and in partly or in completely neutralized form in the polymerization. Of course, mixtures of a plurality of different monomers (B) may also be used.

The person skilled in the art makes a suitable choice from the additional monomers (B), depending on the desired properties of the dispersions. The comonomers are used for the preparation of the polymers in amounts such that the resulting polymers are water-soluble. The amount of comonomers (B) is usually from 0 to 75% by weight, preferably from 1 to 50% by weight and particularly preferably from 5 to 25% by weight, based on the total amount of monomers used in the polymerization.

Preferred copolymers are, for example, copolymers of from 25 to 90% by weight of acrylic acid and from 75 to 10% by weight of acrylamide, allyl ether ethoxylates, (meth)acrylates of polyalkylene glycols and/or alkylpolyalkylene glycols as comonomers.

In a preferred embodiment of the invention, polymerization can additionally be carried out in the presence of at least one crosslinking agent (C). In this case, copolymers having a higher molar mass than in the case of the polymerization of the monomers (A) and optionally (B) in the absence of a crosslinking agent are obtained.

In a manner known in principle, compounds which have at least two ethylenically unsaturated double bonds in the molecule can be used as crosslinking agent (C). Examples of suitable crosslinking agents include triallylamine, pentaerythrityl triallyl ether, methylenebisacrylamide, N,N'-divinylethyleneurea, dihydric alcohols completely esterified with acrylic acid or methacrylic acid and having 2 to 4 carbon atoms, such as ethylene glycol dimethacrylate, ethylene glycol diacrylate, butanediol dimethacrylate, butanediol diacrylate, diacrylates or dimethacrylates of polyethylene glycols having molecular weights of from 300 to 600, ethoxylated trimethylenepropane triacrylates or ethoxylated trimethylenepropane trimethacrylates, 2,2-bis(hydroxymethyl)butanol trimethacrylate, pentaerythrityl triacrylate, pentaerythrityl tetraacrylate or triallylmethylammonium chloride.

However, the crosslinking should on no account be too high for the application according to the invention, so that the water solubility of the polymers is not adversely affected. If crosslinking agents are used in the preparation of the anionic dispersions, the amounts of crosslinking agent which are used in each case are as a rule from 0.0005 to 5.0% by weight, preferably from 0.001 to 2.0% by weight, particularly preferably from 0.01 to 1.5% by weight and very particularly preferably from 0.1 to 1% by weight, based in each case on the total amount of all monomers used in the polymerization.

The acidic monomers (A) and optionally further monomers (B) or (C) are polymerized by free radical polymerization. For this purpose, it is possible to use conventional initiators which form free radicals under the reaction conditions. Suitable polymerization initiators are, for example, peroxides, hydroperoxides, hydrogen peroxide, redox catalysts and azo compounds, such as 2,2-azobis(N,N-dimethyleneisobutyramidine) dihydrochloride, 2,2-azobis(4-methoxy-2,4-dimethylvaleronitrile), 2,2-azobis(2,4-dimethylvaleronitrile) and 2,2-azobis(2-amidinopropane)dihydrochloride. The initiators are used in the amounts customary in the polymerization. Azo initiators are preferably used as polymerization initiators. However, the polymerization can also be initiated with the aid of high-energy radiation, such as electron beams, or by exposure to UV light.

The polymerization of the monomers for the preparation of the polymer dispersions used according to the invention is carried out in the presence of at least one water-soluble polymeric stabilizer.

In a preferred embodiment of the invention, the at least one polymeric stabilizer may be selected from the group (a), group (b) and/or group (c). Of course, mixtures of different stabilizers (a) and/or (b) and/or (c) may also be used.

Water-soluble graft polymers of vinyl acetate on polyethylene glycols, polyethylene glycols endcapped at one or both ends with alkyl, carboxyl or amino groups and/or copolymers of alkylpolyalkylene glycol methacrylates and methacrylic acid are preferred as a stabilizer of group (a). Polyalkylene glycols are described, for example, in WO-A-03/046024, page 4, line 37 to page 8, line 9. For example, from 10 to 1000, preferably from 30 to 300, parts by weight of vinyl acetate are grafted onto 100 parts by weight of the grafting base. Polyethylene glycol having a molecular weight $M_n$ of from 1000 to 100 000 g/mol is preferably used as the grafting base.

Preferred stabilizers of group (a) are moreover copolymers of alkylpolyalkylene glycol acrylates or alkylpolyalkylene glycol methacrylates and acrylic acid and/or methacrylic acid. Such compounds are known, for example, as dispersants for cement. They are prepared by first esterifying adducts of ethylene oxide and/or propylene oxide and, for example, $C_1$- to $C_{18}$-alcohols with acrylic acid and/or methacrylic acid and then copolymerizing these esters with acrylic acid and/or methacrylic acid. The copolymers usually used comprise, for example, from 5 to 60, preferably from 10 to 35, % by weight of polymerized units of alkylpolyalkylene glycol(meth)acrylates and from 95 to 40, preferably from 90 to 65, % by weight of polymerized units of (meth)acrylic acid. They preferably have molar masses $M_w$ of from 2000 to 50 000, preferably from 5000 to 20 000. These copolymers can be used in the form of the free acid groups or in completely or partly neutralized form in the preparation of the dispersions according to the invention. The carboxyl groups of the copolymers are preferably neutralized with sodium hydroxide solution or ammonia.

Further suitable water-soluble polymers (a) are polyalkylene glycols having molar masses $M_n$ of from 100 to 100 000 g/mol, preferably from 300 to 80 000 g/mol, particularly preferably from 600 to 50 000 g/mol and in particular from 1000 to 50 000 g/mol, polyalkylene glycols endcapped at one or both ends with alkyl, carboxyl or amino groups having molar masses $M_n$ of from 100 to 100 000 g/mol, preferably from 300 to 80 000 g/mol, particularly preferably from 600 to 50 000 g/mol and in particular from 1000 to 50 000 g/mol. Water-soluble polymers are described, for example, in the above-cited WO-A-03/046024, page 4, line 37 to page 8, line 9. Preferred polyalkylene glycols are polyethylene glycol, polypropylene glycol and block copolymers of ethylene oxide and propylene oxide. The block copolymers may comprise ethylene oxide and propylene oxide incorporated in the form of polymerized units in any desired amount and in any desired sequence. The terminal OH groups of the polyalkylene glycols can, if appropriate, be blocked with a methyl group.

Hydrolyzed copolymers of vinyl alkyl ethers and maleic anhydride in the form of the free carboxyl groups and in the form of the salts at least partly neutralized with alkali metal hydroxides or ammonium bases are preferably used as water-soluble polymeric stabilizers of group (b). The alkyl group of the vinyl alkyl ethers may have, for example, 1 to 4 carbon atoms. The copolymers are obtainable by copolymerization of vinyl alkyl ethers with maleic anhydride and subsequent hydrolysis of the anhydride groups to carboxyl groups and, if appropriate, partial or complete neutralization of the carboxyl groups. Particularly preferred water-soluble polymers of group (b) are hydrolyzed copolymers of vinyl methyl ether and maleic anhydride in the form of the free carboxyl groups and in the form of the salts at least partly neutralized with sodium hydroxide solution, potassium hydroxide solution or ammonia.

Further suitable water-soluble polymeric stabilizers of group (b) are water-soluble starches from the group consisting of cationically modified potato starch, anionically modified potato starch, degraded potato starch and maltodextrin. Anionically modified potato starches are obtainable, for example, by carboxylation. The degradation of potato starches can be effected, for example, enzymatically or hydrolytically. Among said starches, maltodextrin is preferably used.

Water-soluble stabilizers of group (c) are water-soluble copolymers comprising
(c1) water-soluble, nonionic, monoethylenically unsaturated monomers,
(c2) water-soluble, cationic, monoethylenically unsaturated monomers and optionally
(c3) water-soluble, anionic, monoethylenically unsaturated monomers, the proportion of the cationic monomers incorporated in the form of polymerized units being greater than that of the anionic monomers.

Examples of water-soluble, nonionic monomers (c1) are acrylamide, methacrylamide, N-vinylformamide, N-vinylpyrrolidone and N-vinylcaprolactam. In principle, all nonionic, monoethylenically unsaturated monomers which have a water solubility of at least 100 g/l at a temperature of 20° C. are suitable as monomers of the group (c1). Particularly preferred monomers (c1) are those which are miscible in any ratio with water and form clear aqueous solutions, such as acrylamide and N-vinylformamide.

Water-soluble, cationic, monoethylenically unsaturated monomers (c2) are, for example, dialkylaminoalkyl(meth)acrylates, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dialkyldiallylammonium halides, such as dimethyldiallylammonium chloride and diethyldiallylammonium chloride, N-vinylimidazole and quaternized N-vinylimidazole. Basic monomers, such as dimethylaminoethyl acrylate or dimethylaminoethyl methacrylate, can be used both in the form of the free bases and in a form partly or completely neutralized with acids, such as hydrochloric acid, sulfuric acid, formic acid or p-toluenesulfonic acid. The basic monomers can moreover be partly or completely quaternized with $C_1$- to $C_{18}$-alkyl halides and/or $C_1$- to $C_{18}$-alkyl or $C_1$- to $C_{18}$-alkylaryl halides and can be used in this form in the polymerization. Examples of these are the dimethylaminoethyl(meth)acrylates completely quaternized with methyl chloride, such as dimethylaminoethyl acrylate methochloride or dimethylaminoethyl methacrylate methochloride. The polymers of group (c) may also comprise vinylamine units as a cationic group. Such polymers are obtainable, for example, by polymerizing N-vinylformamide, if appropriate together with at least one anionic water-soluble monomer, and then hydrolyzing the polymers with elimination of some of the formyl groups to give polymers comprising vinylamine units.

The polymeric stabilizers of group (c) can optionally also comprise at least one anionic monoethylenically unsaturated monomer (c3) incorporated in the form of polymerized units. Examples of such monomers are the abovementioned anionic monomers which form water-soluble polymers, such as acrylic acid, methacrylic acid, vinylsulfonic acid, vinylphosphonic acid, maleic acid, fumaric acid, crotonic acid, itaconic acid and the alkali metal and ammonium salts of these acids.

Examples of preferred stabilizers of group (c) are water-soluble copolymers of

- (c1) acrylamide, methacrylamide, N-vinylformamide, N-vinylpyrrolidone and/or N-vinylcaprolactam,
- (c2) dialkylaminoalkyl acrylate, dialkylaminoalkyl methacrylate, partly or completely neutralized dialkylaminoalkyl(meth)acrylates, quaternized dialkylaminoalkyl (meth)acrylates, dialkyldiallylammonium halides, N-vinylimidazole and quaternized N-vinylimidazole and, if appropriate,
- (c3) acrylic acid, methacrylic acid, vinylsulfonic acid, vinylphosphonic acid, maleic acid, fumaric acid, crotonic acid, itaconic acid and the alkali metal and ammonium salts of these acids.

The water-soluble polymeric stabilizers (c) comprise, for example,

- (c1) from 2 to 90, preferably from 20 to 80 and particularly preferably from 35 to 70 mol % of at least one nonionic monomer
- (c2) from 2 to 90, preferably from 20 to 80 and particularly preferably from 35 to 70 mol % of at least one cationic monomer, and
- (c3) from 0 to 48.9 mol %, preferably from 0 to 30 and particularly preferably from 0 to 10 mol % of at least one anionic monomer incorporated in the form of polymerized units,
    the proportion of the cationic monomer units being greater than that of the anionic monomer units.

Individual examples of polymeric stabilizers (c) are copolymers of acrylamide and dimethylaminoethyl acrylate methochloride, copolymers of acrylamide and dimethylaminoethyl methacrylate methochloride, copolymers of acrylamide and dimethylaminopropyl acrylate methochloride, copolymers of methacrylamide and dimethylaminoethyl methacrylate methochloride, copolymers of acrylamide, dimethylaminoethyl acrylate methochloride and acrylic acid, copolymers of acrylamide, dimethylaminoethyl methacrylate methochloride and methacrylic acid and copolymers of acrylamide, dimethylaminoethyl acrylate methochloride and acrylic acid.

The stabilizers (c) have, for example, a K value of from 15 to 200, preferably from 30 to 150 and particularly preferably from 45 to 110 (determined according to H. Fikentscher, Cellulose-Chemie, Volume 13, 58-64 and 71-74 (1932) in 3% strength by weight aqueous sodium chloride solution at 25° C., a polymer concentration of 0.1% by weight and a pH of 7).

In a preferred embodiment of the invention, the stabilizers are at least two different water-soluble stabilizers. These are at least one water-soluble polymeric stabilizer selected from the group of (a) and at least one water-soluble polymeric stabilizer selected from the group of (b) and/or (c).

The total amount of all stabilizers used is together usually from 5 to 250% by weight, based on the amount of the water-soluble polymer. Preferably, the amount is from 25 to 200% by weight, particularly preferably from 50 to 175% by weight and very particularly preferably from 75 to 150% by weight.

If a combination of (a) and (b) and/or (c) is used, the weight ratio of the water-soluble polymeric stabilizers of group (a) to the water-soluble polymeric stabilizers of group (b) and/or (c) in the dispersions used according to the invention is usually from 1:5 to 5:1 and preferably in the range from 1:2 to 2:1, particularly preferably from 1:1.5 to 1.5:1.

Particularly preferred combinations of stabilizers for carrying out the invention are mentioned below.

Combination 1:
- (a) At least one graft polymer of vinyl acetate on polyethylene glycols having a molecular weight $M_n$ of from 1000 to 100 000 g/mol and
- (b) at least one hydrolyzed copolymer of vinyl methyl ether and maleic anhydride in the form of the free carboxyl groups or in the form of the salts at least partly neutralized with sodium hydroxide solution, potassium hydroxide solution or ammonia.

Combination 2:
- (a) Copolymers of alkylpolyalkylene glycol acrylates or alkylpolyalkylene glycol methacrylates and acrylic acid and/or methacrylic acid and
- (b) at least one hydrolyzed copolymer of vinyl methyl ether and maleic anhydride in the form of the free carboxyl groups or in the form of the salts at least partly neutralized with sodium hydroxide solution, potassium hydroxide solution or ammonia.

Combination 3:
- (a) Polypropylene glycols, polyethylene glycols and/or block copolymers of ethylene oxide and propylene oxide having molecular weights $M_n$ of from 300 to 50 000 g/mol and/or polypropylene glycols, polyethylene glycols and/or block copolymers of ethylene oxide and propylene oxide having a molecular weight $M_n$ of from 300 to 50 000 g/mol, which are endcapped at one or both ends with $C_1$- to $C_4$-alkyl groups, and
- (b) maltodextrin.

Combination 4:
- (a) At least one block copolymer of ethylene oxide and propylene oxide and
- (b) at least one copolymer of acrylamide and dimethylaminoethyl acrylate methochloride.

The free radical polymerization is carried out in an aqueous medium. Techniques for free radical polymerization are known in principle to the person skilled in the art. Usually only water is used as the reaction medium for the polymerization, but it is also possible to use small amounts of water-miscible solvents, such as, for example, alcohols. However, the amount of such water-miscible solvents should as a rule not exceed 20% by weight, preferably 10% by weight, based on the amount of all solvents used. The aqueous polymerization medium can, if appropriate, also comprise further typical assistants.

The polymerization is usually carried out at a pH of from 1 to 12, preferably from 2 to 5. The pH can be determined on the one hand by the choice of the type and amount of the monomers. However, it can, of course, also be established by adding suitable acids or bases.

The polymerization can be carried out, for example, by initially taking the stabilizers in the reaction medium and the monomers, then heating them to the desired temperature and, after the polymerization temperature has been reached, adding initiator and, if appropriate, further monomers, without there being any intention to restrict the invention to this procedure.

The aqueous dispersions obtained by means of the process described comprise firstly the water-soluble polymer of the monomers (A) and, if appropriate, (B) and/or crosslinking agent (C) and moreover the stabilizers. The solids concentration, i.e. the amount of water-soluble polymer and stabilizer, depends initially on the concentrations chosen by the person skilled in the art in the course of the polymerization process. It may be, for example, from 1 to 70% by weight, based on the total amount of the dispersion. The polymerization is preferably operated in such a way that a higher solids concentration is initially obtained. Solids concentrations of from 5 to 60% by weight, preferably from 10 to 50% by weight and particularly preferably from 20 to 40% by weight have proven useful. In this procedure, the dispersions can advantageously be transported as a concentrate to the place of use and diluted to the desired concentration for use only on site.

The particle size of the dispersions is usually from 0.1 to 200 μm, preferably from 0.5 to 100 μm and particularly preferably from 1 to 50 μm. It can be adjusted by the person skilled in the art depending on the desired application properties.

The molecular weight $M_w$ of the dispersions used can be adjusted by the person skilled in the art depending on the desired use. The manner in which molecular weights can be adjusted in the course of the free radical polymerization is known to the person skilled in the art, for example by a suitable choice of the polymerization temperature. By means of the process described, it is possible to obtain uncrosslinked polymers having molecular weights $M_w$ in the range of from 10 000 to 15 000 000 g/mol, measured using GPC (gel permeation chromatography, measured against a polyacrylic acid standard) and FFF (field flow fractionation). For crosslinked polymers, the molecular weight cannot be determined in this manner. The molecular weight is dependent on the amount of crosslinking agent used or on the degree of branching of the polymers and can accordingly also be outside said ranges for uncrosslinked polymers. Particularly advantageous dispersions for carrying out the invention can be obtained by carrying out the polymerization at temperatures of from 30 to 70° C., preferably at from 35 to 65° C. and particularly preferably from 40 to 55° C. in the presence of from 0.1 to 1 g of crosslinking agent (C).

For the use according to the invention, polymers having an average molecular weight $M_w$ of from 100 000 to 15 000 000 g/mol, preferably from 500 000 to 12 000 000 g/mol and particularly preferably from 1 000 000 to 10 000 000 g/mol are particularly suitable.

According to the invention, the prepared dispersion is used for tertiary mineral oil production. Of course, two or more different dispersions in combination with one another may also be used. The dispersions can in principle be used without further working-up, in the form in which they are obtained in the preparation.

Regarding the type of dispersion used, the person skilled in the art makes a suitable choice according to the type of mineral oil deposit. Peculiarities of the respective deposit may also be taken into account here. Thus, for example, dispersions of acrylic acid homopolymers are suitable for mineral oil deposits having a low salt content. In the case of salt-rich mineral oil deposits, in particular in the presence of divalent cations, such as, for example, $Ca^{2+}$, the salt compatibility of the water-soluble polymers can be improved by using comonomers having polyalkylene oxide side chains, such as, for example, allyl ether ethoxylates, (meth)acrylates of polyalkylene glycols and/or alkylpolyalkylene glycols, as comonomers. For example, copolymers of from 25 to 90% by weight of acrylic acid and from 75 to 10% by weight of allyl ether ethoxylates, (meth)acrylates of polyalkylene glycols and/or alkylpolyalkylene glycols as comonomers can be used. As a rule, it is advisable to use polymers modified in this manner in the case of a concentration of more than 0.1% by weight of divalent cations in the aqueous phase in the mineral oil deposit.

According to the invention, those dispersions whose viscosity increases in the case of a pH increase and/or dilution can particularly advantageously be used. This need not be the case in the entire pH range and/or in the entire concentration range. Those dispersions whose viscosity is higher in the neutral and basic pH range than in the acidic pH range are particularly suitable. The increase in the viscosity preferably takes place in the pH range of from 3 to 11, preferably from pH 4 to pH 10. The increase in the viscosity on dilution is particularly pronounced in the solids content range from 35% by weight to 1.5% by weight, preferably from 15 to 2% by weight. As a rule, the viscosity increase is a combined viscosity increase due to dilution and pH increase. Such properties can be achieved in particular using those water-soluble polymers which have a high proportion of acidic monomers (A), in particular (meth)acrylic acid, for example those having at least 80% by weight of monomer (A) and preferably easy crosslinking with from 0.1 to 1% by weight of crosslinking agent (C). If, conversely, a high pH dependence is not desired for certain applications, the use of higher proportions of (meth)acrylamide or (meth)acrylamide derivatives, for example in amounts of at least 25% by weight, is advisable.

For use, the dispersion is introduced into the mineral oil deposit. The method of introduction is not relevant here.

In an embodiment of the invention, the dispersion used according to the invention is used, in a manner known in principle, as an additive to the aqueous phase in polymer, steam or hot water flooding. It is metered into the aqueous phase used for flooding, in an amount such that the desired concentration results.

The metering can preferably be carried out continuously by introducing the dispersion into a stream of the liquid medium. The dispersion dissolves in the aqueous phase, as a rule within seconds, without the formation of troublesome gel particles occurring thereby. In order to promote the dissolution process, the stream may also pass through a suitable mixing zone. This may be, for example, a stirrer or simple internals which ensure sufficient turbulence of the liquid stream. Expensive mixing stations are, however, generally superfluous; it is particularly advantageous that there is no need to use dispersing units which can exert strong shear forces on the flooding medium.

The aqueous phase used for flooding may optionally also comprise further additives and assistants, provided that no adverse effect occurs. Examples of suitable assistants comprise, for example, surfactants, biocides or sacrificial agents which are intended to prevent the loss of polymer. Furthermore, the pH of the flooding medium can be established in the desired manner by adding acids or bases. Of course, it is also possible to use in the flooding medium other polymers differing from the polymers contained in the aqueous dispersion. Preferably, only the dispersion is used.

The further additives may also be used separately. Thus, for example, a flood comprising a sacrificial agent or an alkaline agent, thereafter a surfactant flood and finally a flood comprising the polymers according to the invention can be forced into the deposit.

Concentrations of from 0.005 to 5% by weight of solid, i.e. water-soluble polymer and stabilizer together, preferably from 0.0075 to 4% by weight and particularly preferably from 0.01 to 3% by weight, based on the aqueous flooding medium, have proven useful.

The viscosity of the flooding medium should as far as possible be adapted to the viscosity of the mineral oil in the mineral oil deposit. The dispersions used according to the invention are suitable in particular for mineral oil viscosities of up to 400 mPa·s and preferably of up to 250 mPa·s.

The aqueous flooding medium is then forced into at least one well of a deposit in a manner known in principle under pressure. Here, the aqueous phase may be at room temperature or may also have an elevated temperature. It may furthermore be mixed with steam and forced in. The mineral oil released is as a rule withdrawn from other wells of the deposit.

According to the invention, the dispersion can also be used in $CO_2$ flooding in the WAG process. For this purpose, the aqueous solution is used as described, $CO_2$ additionally being forced into the deposit.

In a particularly advantageous embodiment of the invention, the dispersion is not mixed with the flooding medium prior to introduction into the mineral oil deposit but is introduced in a higher concentration through the well and is diluted to the desired final concentration only in the well or preferably in the mineral oil deposit.

Dispersions whose viscosity increases with increasing pH and/or dilution are preferably used for this purpose. In this embodiment of the invention, dispersions which have a concentration of at least 5% by weight of solid, for example a proportion of from 5 to 35% by weight of solid, preferably from 5 to 25% by weight and particularly preferably from 8 to 20% by weight, can preferably be used. It furthermore usually has a pH in the acidic range, for example a pH of from 2 to 6, preferably from 2 to 5.

Such a dispersion can be forced into the deposit in a manner known in principle. The dilution in the deposit can be effected with water which is already present in the deposit, or flooding water can be forced through the well for dilution. The pH of the flooding water is preferably brought to the desired value by means of a suitable base, for example NaOH. In particular, a pH of from 7 to 11, preferably from 7 to 10, has proven useful. As a result of the dilution and/or pH adjustment, the viscosity increases only in the deposit itself. In this procedure, the dispersion can be forced into the deposit with lower forces owing to a lower viscosity, and improved penetration of the deposit with the dispersion can be achieved. Of course, the converse procedure is also possible, i.e. first flooding the mineral oil deposit with aqueous alkali and then forcing in an acidic dispersion.

A possible embodiment of this process is to force dispersion and flooding water or other flooding media alternately through at least one well into the mineral oil deposit. The flooding water can of course also be dilute base for the pH adjustment.

The examples which follow are intended to explain the invention in more detail:

The following stabilizers were used for the synthesis of the dispersions:

Stabilizer 1: Graft polymer of vinyl acetate on polyethylene glycol having a molecular weight $M_n$ of 6000, polymer concentration 20%

Stabilizer 2: Hydrolyzed copolymer of vinyl methyl ether and maleic acid in the form of the free carboxyl groups, polymer concentration 35%

Stabilizer 3: Block copolymer of polyalkylene glycols having a molecular weight $M_n$ of 1000

Stabilizer 4: Maltodextrin (C-PUR01910, 100% strength)

The viscosity of the dispersions was measured in each case in a Brookfield viscometer using a spindle No. 4 at 20 rpm and a temperature of 20° C.

EXAMPLE 1

In a four-necked flask which had a capacity of 250 ml and was equipped with a Teflon stirrer and an apparatus for working under nitrogen, 90.0 g of stabilizer 1, 51.4 g of stabilizer 2 and 28.6 g of demineralized water were initially taken while passing through nitrogen and were stirred at a speed of 300 rpm. A mixture of 30 g of acrylic acid and 0.09 g of triallylamine as a crosslinking agent was added dropwise to this solution in the course of from 5 to 10 minutes, and the mixture was heated to a temperature of 40° C. in the course of from 5 to 10 minutes. Thereafter, 0.03 g of 2,2'-azobis(4-methoxy-2,4-dimethylvaleronitrile) was added and the mixture was polymerized for 5 hours at a temperature of 40° C. Thereafter, a further 0.05 g of said initiator was added for postpolymerization, and the dispersion was heated for one hour to a temperature of 50° C.

An aqueous dispersion having a viscosity of 2700 mPa·s, a pH of 4 and a solids content of 33% by weight was obtained. The particle size distribution of the dispersed particles of the polymer dispersion was from 5 to 60 μm.

EXAMPLE 2

In the apparatus mentioned in example 1, 90.0 g of stabilizer 1, 51.4 g of stabilizer 2 and 28.6 g of demineralized water were initially taken and were stirred at a speed of 300 rpm while passing through nitrogen. A mixture of 30 g of acrylic acid and 0.09 g of triallylamine as a crosslinking agent were added dropwise to this solution in the course of from 5 to 10 minutes, and the emulsion was heated to a temperature of 50° C. in the course of from 5 to 10 minutes. Thereafter, 0.03 g of 2,2'-azobis(2,4-dimethylvaleronitrile) was added and the mixture was polymerized for 5 hours at a temperature of 50° C. Thereafter, 0.05 g of 2,2'-azobis (N,N'-dimethylene-isobutyramidine)dihydrochloride was added for postpolymerization, and the dispersion was heated for one hour to a temperature of 60° C.

An aqueous dispersion having a viscosity of 3700 mPa·s, a pH of 4 and a solids content of 33% by weight was obtained. The particle size distribution of the dispersed particles of the polymer dispersion was from 5 to 30 μm.

EXAMPLE 3

In the apparatus mentioned in example 1, 63.0 g of stabilizer 3, 9.0 g of stabilizer 4, 400.0 g of water and 45.0 g of acrylic acid were initially taken and were stirred at a speed of 100 rpm while passing through nitrogen. 0.45 g of sodium persulfate and 14.4 g of water were added to this solution and prepolymerization was effected for 15 minutes at 25° C. 135 g of acrylic acid and 27 g of stabilizer 3 were then added in 2 hours at 25° C. At the same time, 0.18 g of ascorbic acid was added in 7 hours. Postpolymerization was then effected for a further hour. An aqueous dispersion having a viscosity of 800 mPa·s, a pH of 1.5 and a solids content of about 40% by weight was obtained.

EXAMPLE 4

In a four-necked flask which had a capacity of 2 l and was equipped with a stirrer and an apparatus for working under nitrogen, 257.0 g of stabilizer 1, 449.0 g of stabilizer 2 and 102.5 g of demineralized water were initially taken while passing through nitrogen and were stirred at a speed of 200 rpm for 10 minutes. 60 g of acrylic acid were added dropwise to this solution in the course of 10 minutes, the reaction mixture was heated to 60° C., a solution of 90 g of acrylic acid and 1.5 g of ethyltrimethylolpropane triacrylate as a crosslinking agent was added in the course of 3.5 hours and, starting at the same time, a solution of 0.15 g of 2,2'-azobis (N,N'-dimethyleneisobutyramidine)dihydrochloride in 40 g of water was added, the latter solution being added in the course of 4 hours. After the end of the feed, stirring was effected for a further half hour at 60° C. Postpolymerization was then effected for one hour at 60° C. by adding 0.225 g of 2,2'-azobis(N,N'-dimethyleneisobutyramidine)dihydrochloride.

After cooling to room temperature, an aqueous dispersion having a solids content of 36% by weight (aqueous polymer 15%) was obtained.

Tests Relating to Performance Characteristics:

Test 1:

By adding water and sodium hydroxide solution, dilution was effected from the dispersions synthesized in examples 1 to 3.2% strength dispersions having a pH of 7 were prepared. The results of the viscosity measurements are listed in table 1.

Test 2:

100 ml portions of demineralized water (pH 7) were initially taken in beakers, after which the aqueous dispersion according to example 4 was added in different amounts while stirring with a magnetic stirrer. A clear solution was obtained within seconds. The concentration and the pH and, using a Brookfield viscometer DV-II (100 rpm, 20° C.), the viscosity of the resulting polymer solutions were measured.

Thereafter, the pH was brought to a value of 10 with 30% strength NaOH and the viscosity was measured again.

The results of the experiments are listed in table 2.

Comparative Experiment:

1 g of a commercially available pulverulent thickener based on a polyacrylic acid polymer (Carbopol® 674) was added to 100 ml of water (pH 7) in a beaker and stirred thoroughly with a magnetic stirrer. Even after 1 h, the polymer had not yet dissolved to give a clear solution; a major part of the polymer remains undissolved in the form of gel particles. The dissolution experiment was terminated after 1 hour.

TABLE 2 pH adjustment of dilute dispersions according to example 5

| | Before addition of NaOH | | | After addition of NaOH | |
|---|---|---|---|---|---|
| | Concentration | pH | Viscosity [mPa·s] | pH | Viscosity [mPa·s] |
| Example 4-1 | 1500 ppm | 5.2 | 60 | 10.3 | 140 |
| Example 4-2 | 3000 ppm | 5.0 | 105 | 10.3 | 269 |
| Example 4-3 | 6000 ppm | 4.8 | 217 | 10.3 | 680 |
| Example 4-4 | 12 000 ppm | 4.6 | 433 | 10.1 | 1930 |

Examples show that, when dispersions of water-soluble polymers are used according to the invention, homogeneous solutions are obtained very rapidly (within seconds).

With the use of typical thickeners in the form of a solid, no clear solution was obtained even after 1 h.

Dilute solutions which can be obtained using the polymers used according to the invention have viscosities comparable with those of mineral oil. The viscosity can be substantially increased by dilution or the addition of bases.

We claim:

1. A method of tertiary mineral oil production comprising introducing a water-soluble polymer into a mineral oil deposit, wherein
   the water-soluble polymer is in the form of a dispersion of the water-soluble polymer and at least one water-soluble polymeric stabilizer, and wherein
   the water-soluble polymer comprises at least 25% by weight of monoethylenically unsaturated monomers (A) having acidic groups and optionally monoethylenically unsaturated monomers (B) differing therefrom and/or optionally crosslinking agents (C) as monomeric building blocks, where the acidic groups are selected from the group consisting of carboxyl groups, sulfo groups or phosphonic acid groups, and wherein
   the viscosity of the dispersion increases with a pH change and/or dilution,
   wherein the at least one water-soluble polymeric stabilizer is selected from the group consisting of

TABLE 1

Dilution and pH adjustment of the dispersions according to examples 1 to 3

| | Original dispersion | | | | After dilution and pH change | | |
|---|---|---|---|---|---|---|---|
| No. | Solids content (Polymer + stabilizer) [% by weight] | Proportion of stabilizer, based on polymer | pH | Viscosity [mPa·s] | Solids content | pH | Viscosity |
| Example 1 | 33 | 120% | 4 | 2700 | 2 | 7 | 39 000 |
| Example 2 | 33 | 120% | 4 | 3700 | 2 | 7 | 29 000 |
| Example 3 | 40 | 55% | 1.5 | 800 | 2 | 7 | 5000 |

(a) graft polymers of vinyl acetate and/or vinyl propionate on polyethylene glycols, polyethylene glycols endcapped at one or both ends with alkyl, carboxyl or amino groups,
  copolymers of alkylpolyalkylene glycol acrylates or alkylpolyalkylene glycol methacrylates and acrylic acid and/or methacrylic acid,
  polyalkylene glycols or polyalkylene glycols endcapped at one or both ends with alkyl, carboxyl or amino groups,
(b) hydrolyzed copolymers of vinyl alkyl ethers and maleic anhydride in the form of the free carboxyl groups and in the form of the salts at least partly neutralized with alkali metal hydroxides and/or ammonium bases and/or a water-soluble starch from the group consisting of cationically modified potato starch, anionically modified potato starch, degraded potato starch and maltodextrin, and
(c) water-soluble copolymers of
(c1) nonionic monoethylenically unsaturated monomers selected from the group consisting of acrylamide, methacrylamide, N-vinylformamide, N-vinylpyrrolidone and/or N-vinylcaprolactam,
(c2) cationic, monoethylenically unsaturated monomers selected from the group consisting of dialkylaminoalkyl acrylate, dialkylaminoalkyl methacrylate, partly or completely neutralized dialkylaminoalkyl(meth)acrylates, quaternized dialkylaminoalkyl(meth)acrylates, dialkyldiallylammonium halides, N-vinylimidazole and quaternized N-vinylimidazole, and optionally
(c3) anionic acrylic acid, methacrylic acid, vinylsulfonic acid, vinylphosphonic acid, maleic acid, fumaric acid, crotonic acid, itaconic acid and the alkali metal and ammonium salts of these acids,
in the case of (c), the proportion of cationic monomers (c2) incorporated in the form of polymerized units being greater than that of the anionic monomers (c3),
  wherein the total amount of the at least one water-soluble polymeric stabilizer is from 25 to 200% by weight based on the total amount of water-soluble polymer.

2. The method according to claim 1, wherein the viscosity of the dispersion in the neutral and basic pH range is higher than in the acidic pH range.

3. The method according to claim 1, wherein the dispersion is obtainable by free radical polymerization of the monomers (A) and optionally monomers (B) and/or optionally crosslinking agents (C) in an aqueous medium in the presence of from 25 to 200% by weight, based on the sum of all monomers used, of the at least one water-soluble polymeric stabilizer.

4. The method according to claim 1, wherein the at least one water-soluble polymeric stabilizer is a combination of at least one stabilizer selected from the group consisting of (a) and at least one stabilizer differing therefrom selected from group (b) and/or group (c).

5. The method according to claim 1, wherein the dispersion is used as an additive to an aqueous phase in polymer, steam or hot water flooding.

6. The method according to claim 1, wherein the dispersion is used as an additive in $CO_2$ flooding in the water alternated with gas (WAG) process.

7. A process for mineral oil production, comprising adding at least one water-soluble polymer to an aqueous flooding medium and forcing the aqueous flooding medium through at least one well into a mineral oil deposit, and then withdrawing mineral oil from the deposit from at least one well differing therefrom, wherein the water-soluble polymer is in the form of a dispersion of the water-soluble polymer and at least one water-soluble polymeric stabilizer, and wherein the water-soluble polymer comprises at least 25% by weight of monoethylenically unsaturated monomers (A) having acidic groups and optionally monoethylenically unsaturated monomers (B) differing therefrom and/or optionally crosslinking agents (C) as monomeric building blocks, where the acidic groups are selected from the group consisting of carboxyl groups, sulfo groups or phosphonic acid groups, and wherein the viscosity of the dispersion increases with a pH change and/or dilution, wherein the at least one water-soluble polymeric stabilizer is selected from the group consisting of (a) graft polymers of vinyl acetate and/or vinyl propionate on polyethylene glycols, polyethylene glycols endcapped at one or both ends with alkyl, carboxyl or amino groups,
  copolymers of alkylpolyalkylene glycol acrylates or alkylpolyalkylene glycol methacrylates and acrylic acid and/or methacrylic acid,
  polyalkylene glycols or polyalkylene glycols endcapped at one or both ends with alkyl, carboxyl or amino groups,
(c) hydrolyzed copolymers of vinyl alkyl ethers and maleic anhydride in the form of the free carboxyl groups and in the form of the salts at least partly neutralized with alkali metal hydroxides and/or ammonium bases and/or a water-soluble starch from the group consisting of cationically modified potato starch, anionically modified potato starch, degraded potato starch and maltodextrin, and
(c) water-soluble copolymers of
(c1) nonionic monoethylenically unsaturated monomers selected from the group consisting of acrylamide, methacrylamide, N-vinylformamide, N-vinylpyrrolidone and/or N-vinylcaprolactam,
(c2) cationic, monoethylenically unsaturated monomers selected from the group consisting of dialkylaminoalkyl acrylate, dialkylaminoalkyl methacrylate, partly or completely neutralized dialkylaminoalkyl(meth)acrylates, quaternized dialkylaminoalkyl(meth)acrylates, dialkyldiallylammonium halides, N-vinylimidazole and quaternized N-vinylimidazole, and optionally
(c3) anionic acrylic acid, methacrylic acid, vinylsulfonic acid, vinylphosphonic acid, maleic acid, fumaric acid, crotonic acid, itaconic acid and the alkali metal and ammonium salts of these acids,
in the case of (c), the proportion of cationic monomers (c2) incorporated in the form of polymerized units being greater than that of the anionic monomers (c3),
  wherein the total amount of the at least one water-soluble polymeric stabilizer is from 25 to 200% by weight based on the total amount of water-soluble polymer.

8. The process according to claim 7, wherein the viscosity of the dispersion in the neutral and basic pH range is higher than in the acidic pH range.

9. The process according to claim 7, wherein the dispersion is obtainable by free radical polymerization of the monomers (A) and optionally monomers (B) and/or optionally crosslinking agents (C) in an aqueous medium in the presence of from 25 to 200% by weight, based on the sum of all monomers used, of at least one water-soluble polymeric stabilizer.

10. The process according to any of claim 7, wherein the at least one water-soluble polymeric stabilizer is a combination of at least one stabilizer selected from the group consisting of (a) and at least one stabilizer differing therefrom and selected from group (b) and/or group (c).

11. The process according to claim 7, wherein the solids content of the dispersion in the flooding medium is from 0.01 to 10% by weight.

12. A process for mineral oil production, in which at least one flooding medium is forced through at least one well into a mineral oil deposit and mineral oil is withdrawn from the deposit through at least one well differing therefrom, wherein the at least one of the flooding media is an aqueous dispersion of at least one water-soluble polymer and at least one water-soluble polymeric stabilizer, wherein the water-soluble polymer comprises at least 25% by weight of monoethylenically unsaturated monomers (A) having acidic groups and optionally monoethylenically unsaturated monomers (B) differing therefrom and/or optionally crosslinking agents (C) as monomeric building blocks, where the acidic groups being those selected from the group consisting of carboxyl groups, sulfo groups or phosphonic acid groups, and wherein the viscosity of the dispersion increases with a pH change and/or dilution, the dispersion having a solids content of at least 5% by weight and a pH in the acidic range, wherein the at least one water-soluble polymeric stabilizer is selected from the group consisting of (a) graft polymers of vinyl acetate and/or vinyl propionate on polyethylene glycols, polyethylene glycols endcapped at one or both ends with alkyl, carboxyl or amino groups, copolymers of alkylpolyalkylene glycol acrylates or alkylpolyalkylene glycol methacrylates and acrylic acid and/or methacrylic acid, polyalkylene glycols or polyalkylene glycols endcapped at one or both ends with alkyl, carboxyl or amino groups, (d) hydrolyzed copolymers of vinyl alkyl ethers and maleic anhydride in the form of the free carboxyl groups and in the form of the salts at least partly neutralized with alkali metal hydroxides and/or ammonium bases and/or a water-soluble starch from the group consisting of cationically modified potato starch, anionically modified potato starch, degraded potato starch and maltodextrin, and (c) water-soluble copolymers of (c1) nonionic monoethylenically unsaturated monomers selected from the group consisting of acrylamide, methacrylamide, N-vinylformamide, N-vinylpyrrolidone and/or N-vinylcaprolactam, (c2) cationic, monoethylenically unsaturated monomers selected from the group consisting of dialkylaminoalkyl acrylate, dialkylaminoalkyl methacrylate, partly or completely neutralized dialkylaminoalkyl(meth)acrylates, quaternized dialkylaminoalkyl(meth)acrylates, dialkyldiallylammonium halides, N-vinylimidazole and quaternized N-vinylimidazole, and optionally (c3) anionic acrylic acid, methacrylic acid, vinylsulfonic acid, vinylphosphonic acid, maleic acid, fumaric acid, crotonic acid, itaconic acid and the alkali metal and ammonium salts of these acids, in the case of (c), the proportion of cationic monomers (c2) incorporated in the form of polymerized units being greater than that of the anionic monomers (c3), and the dispersion is furthermore diluted in the deposit with water or an aqueous medium, the dilution being effected either with water or aqueous medium which is already present in the deposit or by subsequently forcing water or an aqueous flooding medium into the deposit, wherein the total amount of the at least one water-soluble polymeric stabilizer is of from 25 to 200% by weight based on the total amount of water-soluble polymer.

13. The process according to claim 12, wherein the viscosity of the dispersion in the neutral and basic pH range is higher than in the acidic pH range.

14. The process according to claim 12, wherein the dispersion is obtainable by free radical polymerization of the monomers (A) and optionally monomers (B) and/or optionally crosslinking agents (C) in an aqueous medium in the presence of from 25 to 200% by weight, based on the sum of all monomers used, of the at least one water-soluble polymeric stabilizer.

15. The process according to claim 12, wherein the at least one water-soluble polymer stabilizer is a combination of at least one stabilizer selected from the group consisting of (a) and at least one stabilizer differing therefrom selected from group (b) and/or group (c).

16. The process for mineral oil production according to claim 12, wherein the additional aqueous flooding medium is a basic medium.

17. The process according to claim 12, wherein aqueous dispersion and aqueous flooding medium are forced alternately into the deposit.

18. The method according to claim 1, wherein the amount of monomer (A) is at least 75% by weight based on the total amount of monomers used.

19. The process according to claim 7, wherein the amount of monomer (A) is at least 75% by weight based on the total amount of monomers used.

20. The process according to claim 12, wherein the amount of monomer (a) is at least 75% by weight based on the total amount of monomers used.

* * * * *